Jan. 17, 1956 H. J. WOOLARD 2,731,110
APPARATUS FOR TREATING WITH LIQUID A CAR BODY
HAVING IRREGULAR NON-SYMMETRICAL SURFACES
Filed Dec. 1, 1952 8 Sheets-Sheet 5
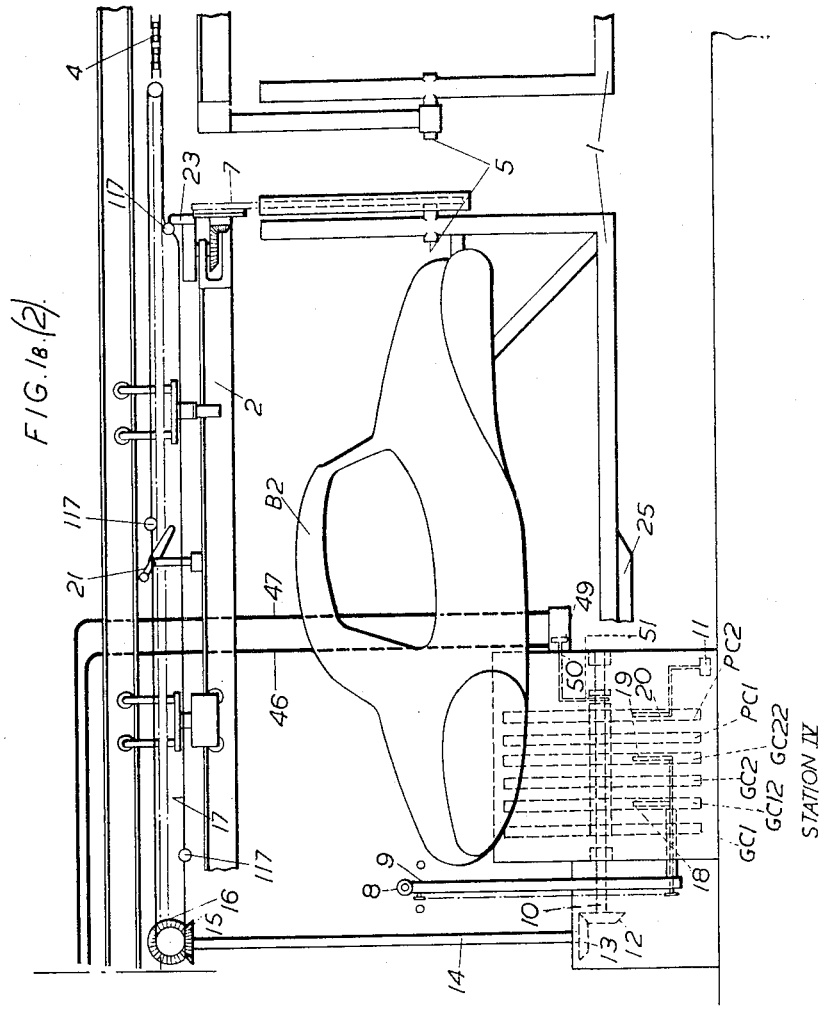
Inventor
Henry J. Woolard,
By
Attorney Jan. 17, 1956　　　H. J. WOOLARD　　　2,731,110
APPARATUS FOR TREATING WITH LIQUID A CAR BODY
HAVING IRREGULAR NON-SYMMETRICAL SURFACES
Filed Dec. 1, 1952　　　　　　　　　　　　8 Sheets-Sheet 6

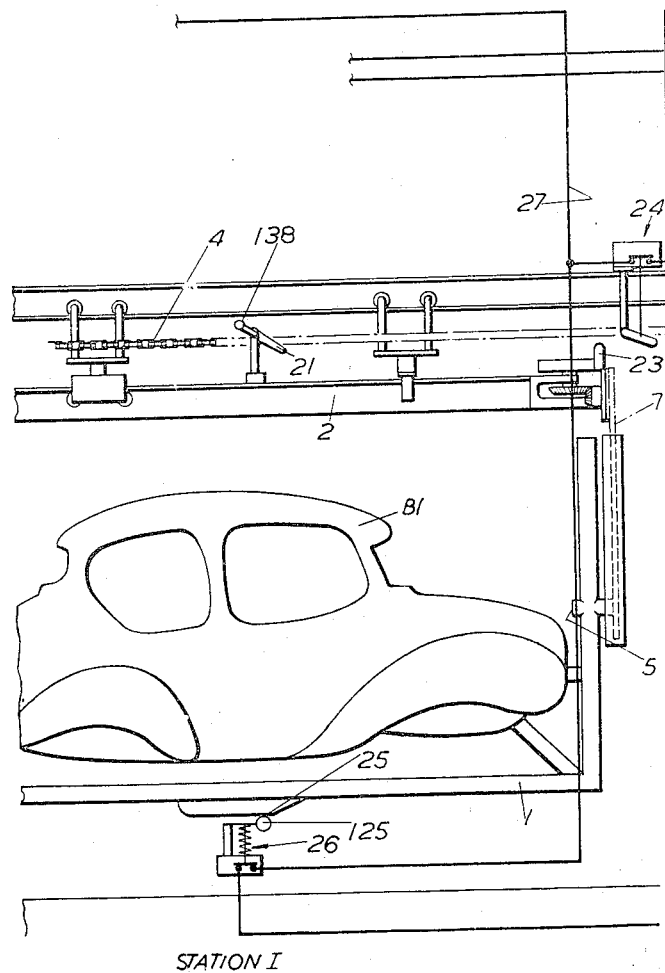

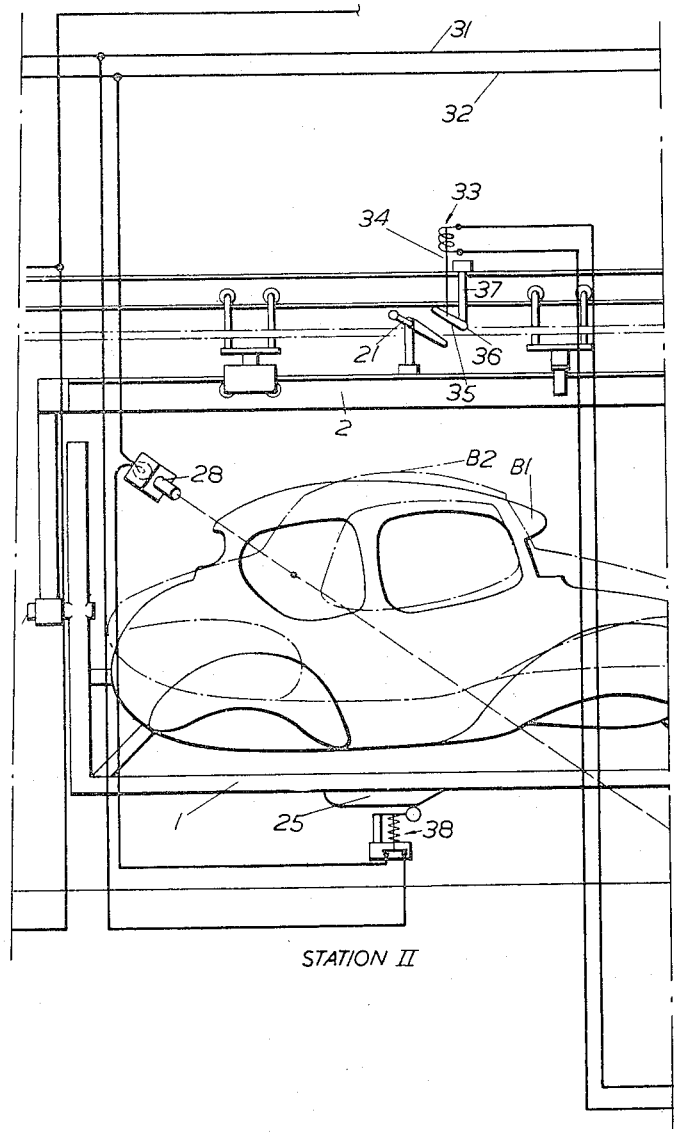

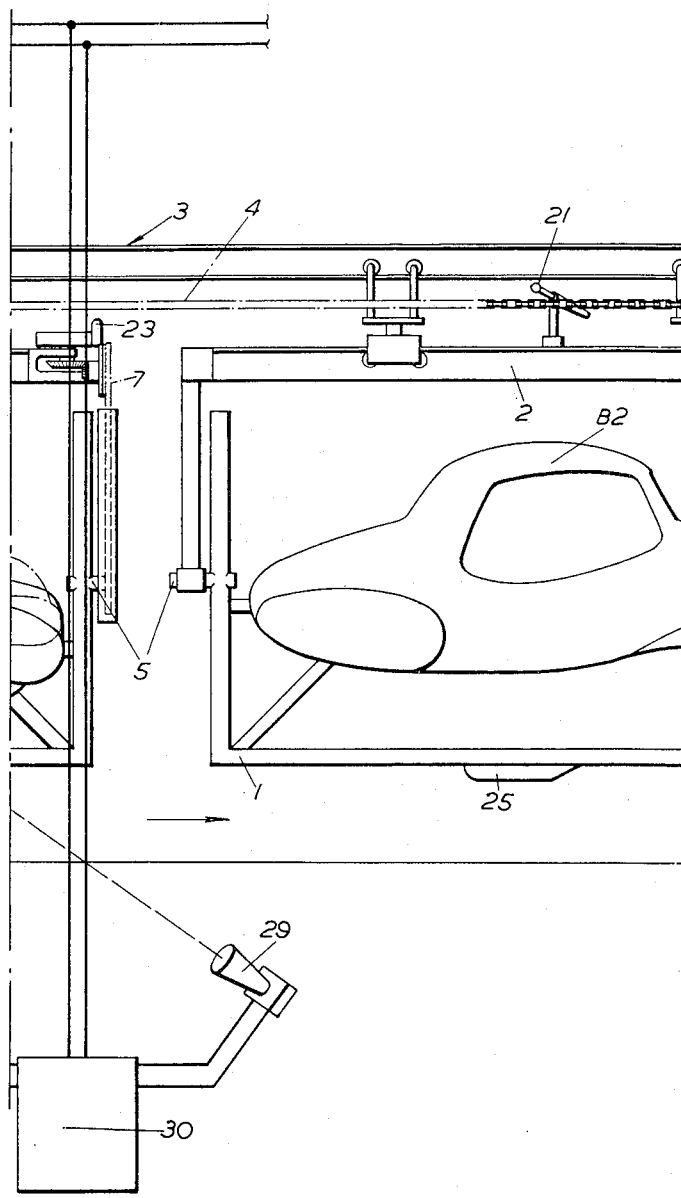
FIG.1A.(3).

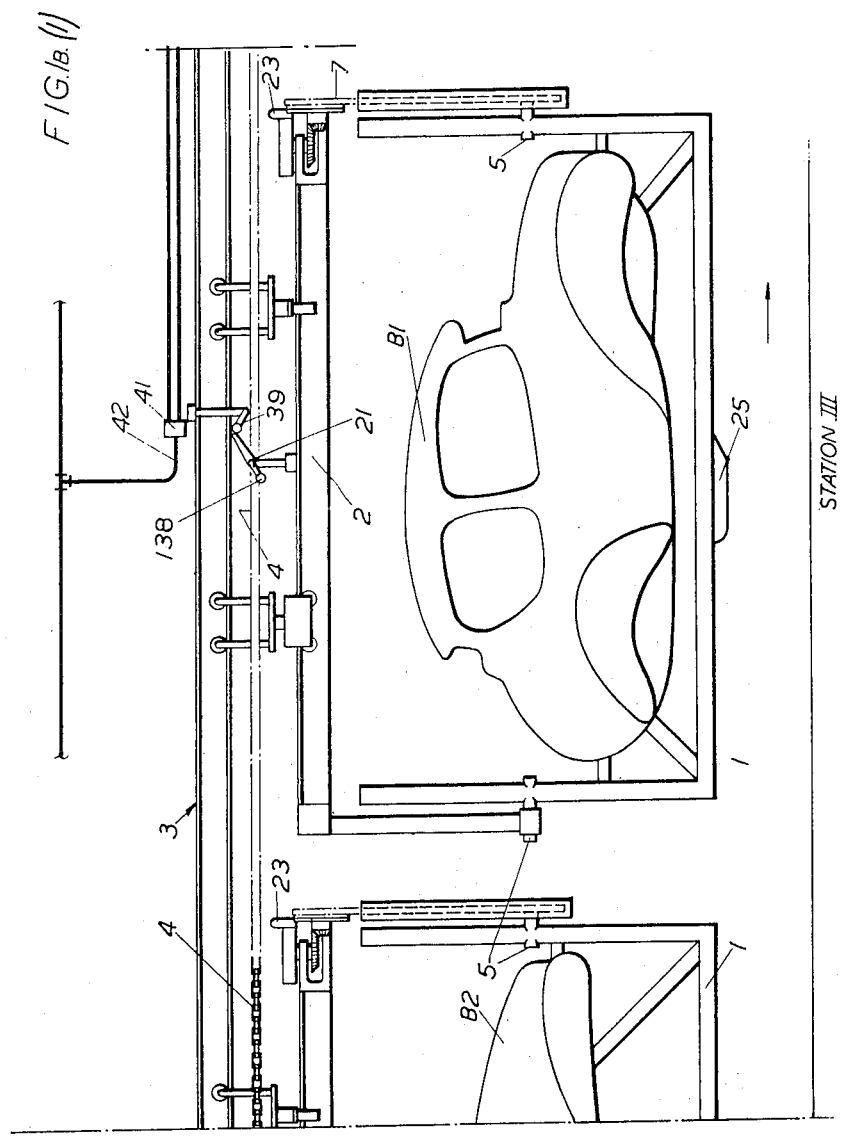

Inventor
Henry J. Woolard,
By
Attorney

Jan. 17, 1956  H. J. WOOLARD  2,731,110
APPARATUS FOR TREATING WITH LIQUID A CAR BODY
HAVING IRREGULAR NON-SYMMETRICAL SURFACES
Filed Dec. 1, 1952  8 Sheets-Sheet 7
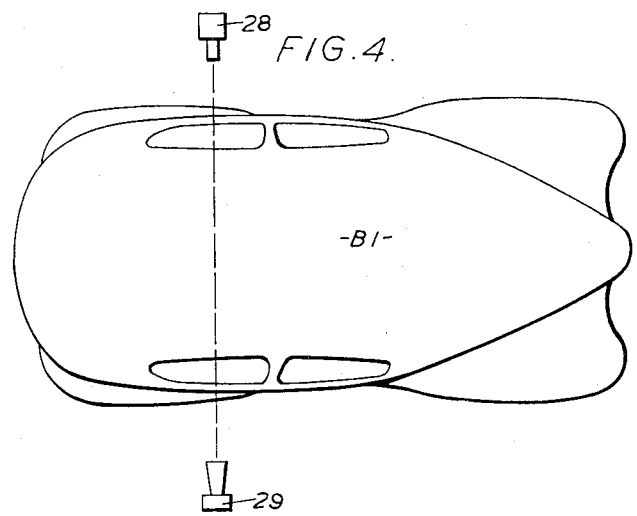
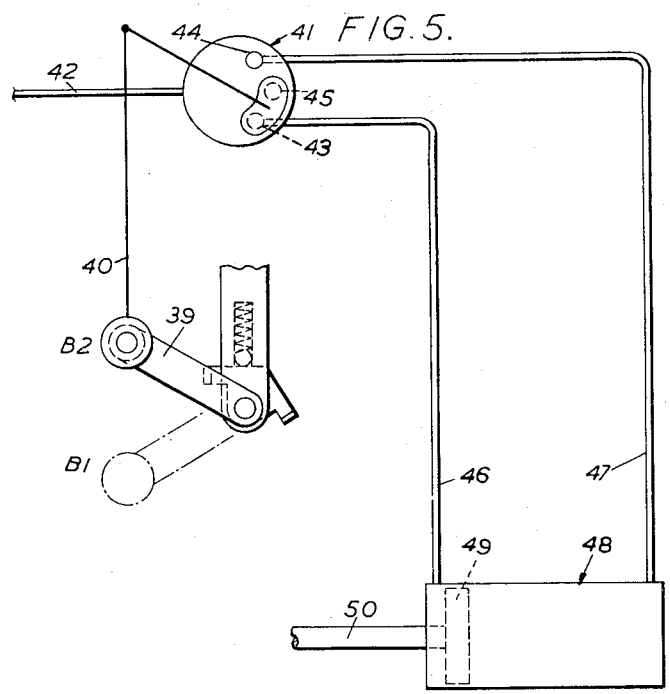
Inventor
Henry J. Woolard,
By
Attorney Jan. 17, 1956  H. J. WOOLARD  2,731,110
APPARATUS FOR TREATING WITH LIQUID A CAR BODY
HAVING IRREGULAR NON-SYMMETRICAL SURFACES
Filed Dec. 1, 1952  8 Sheets-Sheet 8
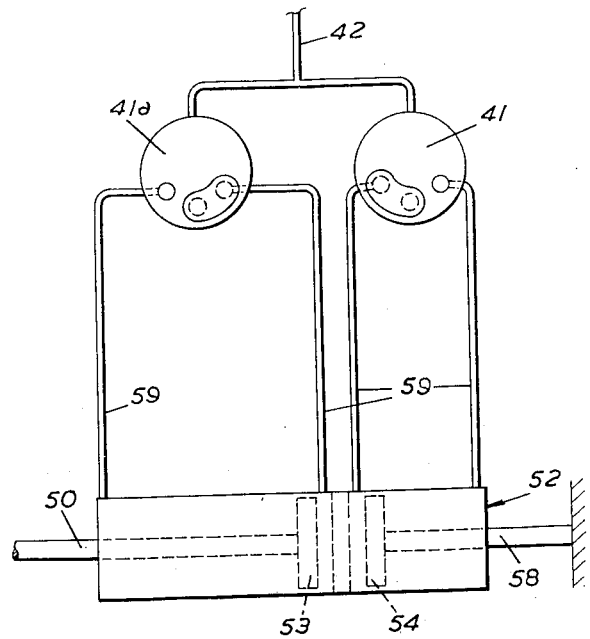
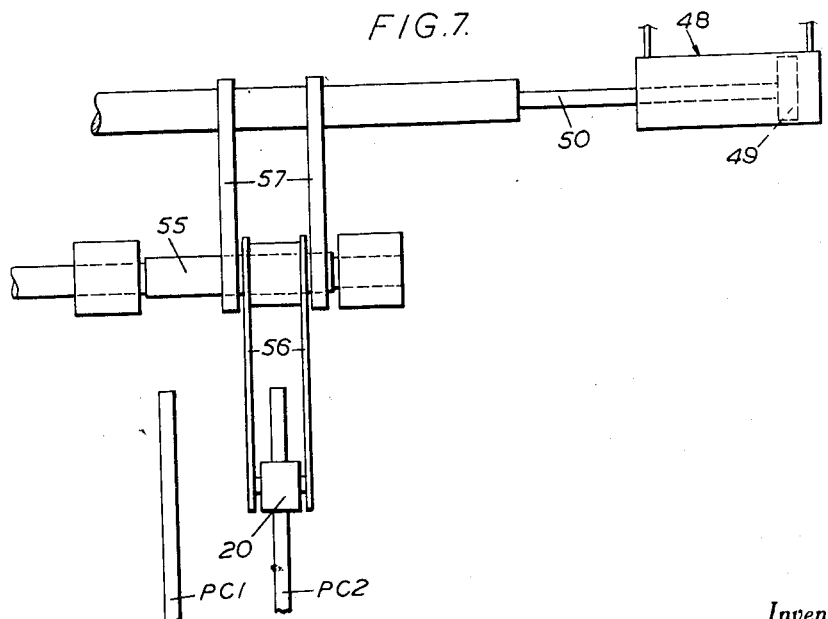
Inventor,
Henry J. Woolard,
By
Attorney

United States Patent Office 2,731,110
Patented Jan. 17, 1956

2,731,110

APPARATUS FOR TREATING WITH LIQUID A CAR BODY HAVING IRREGULAR NON-SYMMETRICAL SURFACES

Henry James Woolard, Farnborough, England, assignor to Carrier Engineering Company Limited, London, England, a British company Application December 1, 1952, Serial No. 323,485

Claims priority, application Great Britain December 3, 1951

13 Claims. (Cl. 118—8)

This invention relates to apparatus for treating with liquid a body having irregular non-symmetrical surfaces, for example a motor-car body, when such bodies are being produced on a quantity production basis.

It has heretofore been proposed to effect liquid treatment of motor-car bodies by supporting the bodies on mounts carried by a conveyor to present each body in turn to a paint projecting device, such as a paint sprayer or a paint flowing device, and to control the emission of paint according to the surface of the body presented for painting at a given instant, such control being effected by control cams rotated in synchronism with the rotation of the body about the axis of the mount on which it is supported. One such proposal is described in Patent No. 2,598,246.

It will, however, be understood that during the operation of such apparatus the bodies which are presented in succession to the liquid projecting device may be of different kinds within a predetermined range of say three kinds of bodies. Accordingly, the apparatus may include a plurality of sets of control cams for selection according to the particular kind of body to be treated at any given time and it is a main object of the present invention to provide apparatus for effecting automatic selection of a set of control cams as appropriate to a particular kind of body being advanced to the liquid projecting position.

According to the invention there is provided in a system for treating with liquid a body having irregular non-symmetrical surfaces, e. g. a motor car body, and in which bodies are supported for passage in succession past a liquid projecting device operation of which is controlled by a set of cams, apparatus comprising a set of axially spaced cams to control operation of the liquid projecting device, a support for said cams and common thereto, a cam follower for each cam of said set, actuating means to effect relative movement between said cams and followers in a direction lengthwise of said support thereby to effect co-operation or otherwise between the cams and followers, control means connected with said actuating means to control operation thereof, and selector means movable with a body support for co-operation with said control means to vary the operation thereof.

Further according to the present invention there is provided in a system for treating with liquid a body having irregular non-symmetrical surfaces, e. g. a motor car body, and in which bodies are supported for passage in succession past a liquid projecting device operation of which is controlled by a set of cams, apparatus comprising at least two sets of axially spaced cams to control operation of the liquid projecting device, a support for said sets of cams and common thereto, a single set of cam followers consisting of one follower for each cam of a set thereof, actuating means to effect relative movement between said sets of cams and said set of followers in a direction lengthwise of said support thereby to effect co-operation or otherwise between a set of cams and the followers, control means connected with said actuating means to control operation thereof, and selector means movable with a body support for co-operation with said control means to vary the operation thereof.

In order that the invention may be clearly understood some embodiments thereof will now be described, by way of example, with reference to the accompanying diagrammatic drawings, in which:

Figures 1A and 1B together illustrate an arrangement of apparatus according to the invention, it being understood that the right-hand end of Fig. 1A joins the left hand end of Fig. 1B.

Figure 2 to an enlarged scale illustrates an arrangement of selector levers for setting actuator levers to control cam selection.

Figure 4 is a plan illustrating diagrammatically the disposition of a light projector and a photo-electric cell to be activated by light from the projector.

Figure 5 illustrates diagrammatically a device operable by the actuator levers to effect cam selection, Figure 6 illustrates an alternative form of device for effecting cam selection, and Figure 7 illustrates apparatus for effecting selection by axial movement of cam followers.

Figure 2:
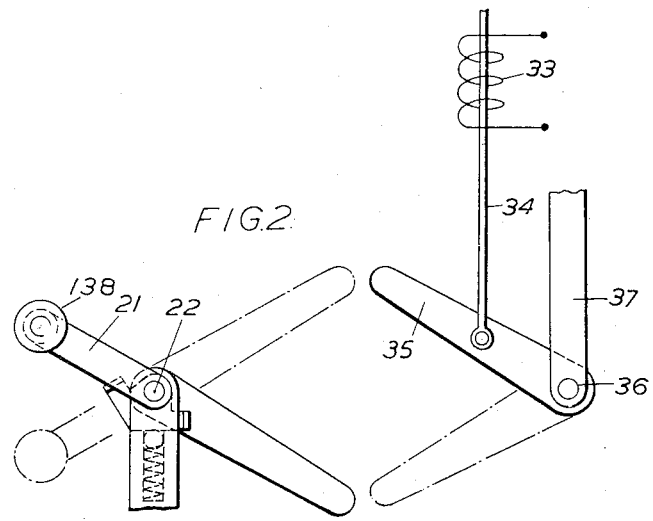

Referring to the drawings, a car body to be treated is supported by a body support shown as a cradle 1 to which it is secured, in known manner, to be movable therewith but immovable relatively thereto. The cradle in known manner, is supported by a beam or outrigger 2 which, in turn, is supported by a mono-rail conveyor 3 the chain 4 of which is driven by an electric motor not shown.

The outrigger 2 carries stub spindles 5 on which the cradle 1 is supported and about which it is rotatable by a chain 7 while passing the treating position. The manner in which the cradle is rotated forms no part of the present invention but may comprise any of the known means for performing this operation, one such form of apparatus being described in Patents No. 2,597,914 and 2,598,246.

A body supported by its cradle is passaged in succession past four stations indicated in Figs. 1A and 1B as Station I, Station II, Station III, and Station IV.

At Station I, as will be described below, means is provided to determine whether or not a cradle is in the correct position for the commencement of a painting operation, at Station II means is provided to determine the type of body carried by a cradle or whether no body is being carried, at Station III selection of cams to control a painting operation is effected, and at Station IV painting of a body is effected automatically.

Painting of a car body B1, Station IV, Fig. 1B, is effected as it is traversed past a spray gun 8 supported by an arm 9, the gun being movable as described in the aforesaid Patent No. 2,598,246 under control of two cams GC1, GC2, Fig. 1B, these cams having respectively the functions of the cams 45, 49 described in Patent No. 2,598,246, and the flow of paint to the gun is controlled by a cam PC1 which corresponds to the cam 51 described in the aforesaid prior Patent No. 2,598,246. The cams GC1, GC2, and PC1 are, in the construction according to the present invention, formed on a drum supported on a rotatable splined shaft 10 for axial movement relative thereto and are cams to control the spraying of a body B1 which is a specific type of body.

Also on the cam drum is a second set of cams, GC12, GC22, PC2 which are designed to control the spraying of a second type of body B2.

Cams PC1 and PC2 are to control the operation of a valve 11, Fig. 1B, which corresponds to the valve 50 described in the aforesaid prior Patent No. 2,598,246.

Rotation of shaft 10 is effected by driving mechanism diagrammatically illustrated in Fig. 1B, and which comprises bevel gears 12, 13, shaft 14, bevel gears 15, 16 and driving chain 17, having thereon pins 117 for engagement by an abutment 23 carried by the outrigger 2, the pins being engaged by the abutment as a body is moved into range of spraying device 8 and disengaged as the body moves out of range of the spraying device 8. Movements of gun 8 and operation of valve 11 are effected by a single set of cam followers 18, 19, 20 which respectively co-operate with cams GC1, GC2, and PC1, or with cams GC12, GC22, and PC2.

In operation bodies B1 and B2 may be presented for spraying in any order and the present invention provides means whereby the appropriate sets of cams GC1, GC2 and PC1, or GC12, GC22 and PC2 may be automatically selected to control the spraying operation.

Selection of the appropriate set of cams is effected, Station II, Fig. 1A, by a selector lever 21 supported by the outrigger 2 for movement therewith in a constant path. The selector lever is illustrated in detail in Figs. 2 and 3 from which figures it will be seen that it is of the kind known as a spring-loaded self-containing lever, that is the lever 21 is secured to a spindle 22, Fig. 2, for rocking movement about the axis of the spindle and remains in a position to which it is set until it is moved positively to another set position. When the apparatus is arranged to be fully automatic the abutment 23 is arranged, at Station I, to open a normally closed electric switch 24, Fig. 1A. From Fig. 1A it will be seen that before the abutment 23 reaches the position at which it can co-operate with switch 24 the leading portion of the cradle 1 will, if it is disposed substantially in the position thereof which it is desired that it shall occupy at the commencement of a painting operation, have engaged a narrow, considered in the direction of movement of the cradle by conveyor 4, skid plate 25 carried by the cradle to co-operate with the actuating member 125 of a normally open electric switch 26. Engagement of plate 25 with member 125 causes switch 26 to be closed.

Switches 24 and 26 are wired in parallel and are in series with the no-volt control circuit 27 for the motor driving conveyor 4. Thus if the cradle 1 is in the desired angular position thereof when it reaches switch 26, the actuating member 125 will be depressed by the plate 25 and will close switch 26 which remains closed by the cradle until, and after, the abutment 23 opens switch 24. Accordingly, the control circuit 27 remains closed and the movement of conveyor 4 is not interrupted. If, however, the cradle should occupy an angular position such that the plate 25 does not engage the actuating member 125 the switch 26 remains open and on opening of switch 24 by abutment 23 the control circuit 27 is opened and the movement of the conveyor 4 is interrupted to permit an operator to adjust the position of the cradle to the required position thereof.

After passing Station I the cradle is passaged past Station II, Fig. 1A, at which station is provided a light projector 28, Figs. 1A and 4, so arranged that if a body B1 is supported by the cradle it projects a beam of light through the window openings of the body on to a photoelectric cell 29 but if the body supported by the cradle is a type B2 the cell 29 is, as illustrated in Fig. 1A, obturated from the light beam.

The cell 29 is connected with an electronic amplifier 30 which is also connected to main supply lines 31, 32 and an electromagnet 33 the armature 34 of which is connected to a setting lever 35 pivoted at 36 to a bracket 37 supported by the rail of the conveyor system 3.

Figure 3:
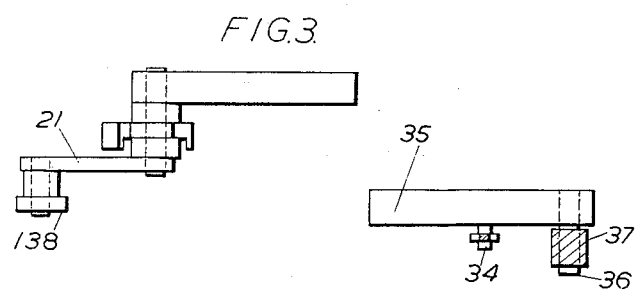
Figure 3 is a plane of Figure 2.

The light projector 28 is controlled by a normally open switch 38 operated upon engagement with its actuating member by the skid plate 25 on the cradle 1 so that a light beam is projected only when the window openings of a body B1 would be passaged by the cradle through the beam. Thus it will be understood that electromagnet 33 will be energised if the cradle supports a type B1 body but not if it supports a type B2 body. If, as illustrated in Fig. 2, the electromagnet 33 is energised, indicating that a type B1 body is on the cradle, and lever 21 is set down, as shown in full lines, indicating that the last body carried by the cradle was a type B2 body, when the selector lever 21 is passaged past the setting lever 35 the roller 138 carried by lever 21 will engage lever 35 and will be urged downwards thereby so that the leading end of lever 21 is moved from the down position thereof to its up position as indicated in dotted lines in Fig. 2.

It will be understood that, if desired, the electromagnets 33 may be replaced by an electro-pneumatic valve controlled by a relay embodied in the amplifier 30.

After passing Station II the cradle is passaged by the conveyor 4 to Station III at which the selector lever 21 can co-operate with a cam setting lever 39 which is supported by the rail of the mono-rail conveyor system 3 and is a self-sustaining lever similar to lever 21. The cam setting lever 39, as illustrated diagrammatically in Fig. 5, is connected with a link 40 which operates a known form of pneumatic rotary slide valve 41 having an input line 42, a front end port 43, a rear end port 44, and an exhaust port 45. The ports 43, 44 are respectively connected by air lines 46, 47 with a known form of pneumatic cylinder 48 having a piston 49 the rod 50 of which supports a fork 51, illustrated diagrammatically in Fig. 1B, engaged in a peripheral groove formed in cam drum on which are provided cams GC1, GC2, PC1 and GC12, GC22, PC2, Station IV.

As illustrated in Fig. 1B, the cams GC12, GC22, PC2 are shown in operative position to control spray device 8 as a type B2 body has just been passaged past the device 8. The next body, however, is a type B1 body and the setting lever 21 is set in the up position thereof. As lever 21 is passaged past lever 39 this latter lever will be urged downwards by setting lever 21 so that, through valve 41, the action of piston 49 will be reversed and rod 50 will move the cam drum axially along shaft 10, to the right as viewed in Fig. 1B, to bring the cams GC1, GC2, PC1 into co-operation with followers 18, 19, and 20 in preparation for the spraying of the type B1 body as it is passaged past the device 8.

It will be understood that should the next succeeding body also be a type B1 body then the cam setting lever 39 will be unaffected by the setting lever 21 on the outrigger 2 for the cradle supporting such next body but if the next body should be a type B2 body then the setting lever 21 will be in its down position and will operate to raise the cam setting lever 39 to the up position thereof thereby again to move the cam drum axially along shaft 10, but this time to the left as viewed in Fig. 1B, to restore the cams to the positions they occupy in Fig. 1B.

As can be seen from Figs. 1A and 1B, between Station II and Station III is a position at which, if desired, there may be performed on the bodies operations which must be effected manually. During such manual operations the operator may rotate the cradle about the stub spindles 5 and inadvertently leave it so that it would no longer occupy the position which it is desired that it shall occupy on entering the spraying position. To check the position of the cradle when it enters Station III there is provided at Station III a duplicate set of the detector apparatus 24, 25, 26, 27 as described above, Station I, so that if the cradle is incorrectly positioned the conveyor 4 is stopped and the position of the cradle manually corrected before it is passed to Station IV and before the lever 21 is moved to the position of lever 35.

It will be understood that although in the foregoing there has been described the selection of one of two sets of cams for operation according to the type of body to be treated the arrangement as described can, if desired, be modified so that there is provided a single set of cams for one type of body and the selection thereof under control of the cam setting lever 39 may be arranged to render the cams active for a spraying operation or, in the event that no body is positioned on a cradle, the cams may be rendered inactive so that no spraying operation is effected when no body is passaged by a cradle past the device 8.

In the foregoing there has been described the simplest form of apparatus according to the invention whereby either one or two different types of body can be accommodated. It will, however, be understood that, if desired, the apparatus can be extended to accommodate cam selection for more than two different types of body.

As an example of this extension of apparatus according to the invention it may be assumed that the apparatus is designed to accommodate four different types of body. In such an arrangement the cam drum will be provided with four sets of cams, Station II will be provided with two suitable disposed light projectors 28, cells 29, and setting levers 35 operated by electromagnets 33, and the outriggers 2 will each support two selector levers disposed side by side for co-operation one with each of the setting levers 35. There will at Station III be arranged two cam setting levers 39, referred to below as levers 39A and 39B, one for co-operation with each of the two setting levers 21 and the cam setting levers will respectively control two valves 41, 41a, Fig. 6, connected to a double-impulse cylinder 52, of known construction, having pistons 53, 54, to effect axial movement of the cam drum thereby to select a set of cams to control operation of the spraying device 8.

As will be well understood, in the devices diagrammatically illustrated in Fig. 6 the rod 58 for piston 54 is anchored against axial movement and the cylinder 52 is supported for axial movement, being connected with valves 41, 41a by flexible tubes 59. Thus under control of valve 41 the cylinder 52 is moved axially together wth piston 53 and rod 50 while under control of valve 41a only rod 50 is moved axially.

It will be understood that, if desired, with the alternative arrangement now being described, one of the four selections made by the pistons 53, 54 instead of selecting a set of cams may render ineffective three sets of cams in the event that a cradle supports no body to be painted. With such an arrangement only three sets of cams will be provided on the cam drum. In the succeeding Tables 1 and 2 illustrating respectively the positions of levers 39A and 39B and of pistons 53, 54 the last stated positions therefor will be considered as capable of being used to select a set of cams to control a type of body B4 or of rendering ineffective three sets of cams for selective use with bodies types B1, B2 or B3.

Table 1

| Type of body | Position of Lever 39A | Position of Lever 39B |
| --- | --- | --- |
| B1 | Up | Up |
| B2 | Up | Down |
| B3 | Down | Up |
| B4 or No body | Down | Down |

Table 2

| Type of body | Piston 53 | Piston 54 |
| --- | --- | --- |
| B1 | In | In |
| B2 | In | Out |
| B3 | Out | In |
| B4 or No body | Out | Out |

In some instances, particularly when the cam drum comprises a multiplicity of sets of cams, it may be desired to move the single set of cam followers 18, 19, 20 relative to the cams instead of, as described above, moving the cam relative to the followers. Fig. 7 diagrammatically illustrates one manner in which this alternative mode of operation may be effected, control of movement of the followers being by a cylinder 48 as illustrated in Fig. 5 for use with two sets of cams, or one set of cams and a no-body condition thereof.

In Fig. 7 only the follower 20 is illustrated but it will be understood that the operation of followers 18 and 19 will be identical with that now to be described, simultaneous selection of each of the followers being obtained from the movement of the rod 50.

From each member, such as the arm 9, to be controlled by a cam extends a support for its cam follower, the support having a portion 55 of square cross-section on which are mounted arms 56 for sliding movement lengthwise of the supports. The arms 56 carry the cam follower 20 and forks 57 movable with rod 50 effect movement of the arms 56 and their followers lengthwise of the supports therefor.

In the foregoing description fully automatic apparatus has been described but, if desired, the position of cradle 1 for a painting operation may be manually determined and selection of setting levers 21 may also be effected manually. In such circumstances the detector devices may be dispensed with, as may the light projector 28, cell 29 and amplifier 30, and the setting lever or levers 35 may be manually operated by a switch or by suitable mechanical means such as an operating lever connected thereto.

It will, of course, be understood that the mode of conveyance of bodies described herein has been given by way of example only and that other means of conveyance may be employed without departing from the invention as defined in the claims appended hereto.

I claim:

1. Apparatus for treating bodies of different types and having irregular non-symmetrical surfaces, comprising a controllable device for projecting a treating liquid, a conveyor movable past said device and including a plurality of body supports each adapted to support a body substantially longitudinally of conveyor movement for rotation about an axis that is substantially longitudinal of conveyor movement, means for rotating the bodies as the respective body supports are advanced by the conveyor longitudinally past said liquid projecting device, control means operatively connected with said projecting device for controlling the operation of said device, said control means including a plurality of control mechanisms each of which corresponds to a particular type of body and a connector mechanism selectively cooperative with said control mechanisms and operatively connected with said liquid projecting device to control said liquid projecting device in accordance with the particular portions of a particular type of body within the range of said liquid projecting device, actuating means for selectively placing said connector mechanism and one of said control mechanisms in cooperative relation, and selector means including a body identifying means and being operatively connected with said actuating means, said identifying means presetting said actuating means in response to the passage of a body identified thereby along said conveyor to actuate said actuating means in accordance with the identified body when such body is disposed within the range of said liquid projecting device.

2. Apparatus for treating bodies of different types and having irregular non-symmetrical surfaces, comprising a controllable device for projecting a treating liquid, a conveyor movable past said device and including a plurality of body supports each adapted to support a body substantially longitudinally of conveyor movement for rotation about an axis that is substantially longitudinal of conveyor movement, means for rotating the bodies as the respective body supports are advanced by the conveyor longitudinally past said liquid projecting device, control means operatively connected with said projecting device for controlling the operation of said device, said control means including a plurality of driven control mechanisms each of which corresponds to a particular type of body and a connector mechanism selectively cooperative with said control mechanisms and operatively connected with said liquid projecting device to control said liquid projecting device in accordance with the particular portions of a particular type of body within the range of said liquid projecting device, means driven by said conveyor for driving said control mechanisms as a body is conveyed past said liquid projecting device, actuating means for selectively placing said connector mechanisms and one of said control mechanisms in cooperative relation, selector means operatively connected with said actuating means and responsive to the passage of a body to actuate said actuating means in accordance with the particular type of body disposed within the range of said liquid projecting device, and body detector means disposed adjacent said conveyor for determining the setting of said selector means in accordance with the body conveyed.

3. Apparatus according to claim 2 comprising means responsive to the angular position of a body on its axis of rotation for stopping said conveyor unless the body is in a predetermined angular position.

4. Apparatus for treating a body having irregular, non-symmetrical surfaces, comprising a controllable device for projecting a treating liquid, a conveyor movable past said device and including a body support having a mount adapted to support a body substantially longitudinally of conveyor movement, said mount being rotatably supported by said body support for rotation about an axis that is substantially longitudinal of conveyor movement, means for rotating said mount as said body support is advanced by the conveyor to rotate a body as it is carried longitudinally past said device, a set of rotatably mounted cams in fixed axially spaced relation, a set of cam followers relatively spaced to respectively engage the cams of said set, means for rotating said cams as a body support is conveyed past said device, means operated by said cam followers and operatively connected with said device to control said device in accordance with the particular portions of a body within the projection range of said device, said set of cams and set of cam followers being relatively movable in a direction axially of said cams to selectively engage said set of followers with said set of cams, actuating means to effect relative axial movement between said set of cams and said set of followers to selectively place said set of followers in operative engagement with said set of cams, control means fixed relative to said conveyor and operatively connected with said actuating means to control operation thereof, selector means movable with said body support and cooperative with said control means to effect the operation thereof, and photo-electric body detector means disposed adjacent said conveyor for determining the setting of said selector means in accordance with the body conveyed.

5. Apparatus for treating bodies of different types and having irregular, non-symmetrical surfaces, comprising a movably supported device for projecting a treating liquid, a conveyor movable past said device and including a plurality of body supports each having a mount adapted to support a body substantially longitudinally of conveyor movement, said mounts being rotatably supported by their respective body supports for rotation about an axis that is substantially longitudinal of conveyor movement, means for rotating said mounts as the respective body supports are advanced by the conveyor to rotate a body as it is carried longitudinally past said device, a plurality of sets of rotatably mounted cams in fixed axially spaced relation, each set of cams corresponding to a type of body adapted to be carried by said body support, a set of cam followers relatively spaced to respectively engage the cams of one set of said cams, means for rotating said cams as a body support is conveyed past said device, means operated by said cam followers and operatively connected with said device to control said device in accordance with the particular portions of a body within the projection range of said device, said sets of cams and said set of cam followers being relatively movable in a direction axially of said cams to selectively engage said set of followers with a selected set of cams, actuating means to effect relative axial movement between said sets of cams and said set of followers to selectively place said set of followers in operative engagement with the selected set of cams, control means fixed relative to said conveyor and operatively connected with said actuating means to control operation thereof, and movably positioned selector means movable with said body support and cooperative with said control means to effect the operation thereof in accordance with the type of body being conveyed past said projection device, said selector means comprising a spring pressed lever pivotally mounted on the said body support and movable between predetermined positions and said control means comprising a spring pressed lever movable between predetermined positions and disposed in the path of said first mentioned lever for cooperation therewith.

6. Apparatus according to claim 5 including a body detector means disposed beside said conveyor in advance of said liquid projecting device and past which the body supports are conveyed, said body detector means being operative to determine the type of body supported by the respective body supports, setting means cooperative with said selector means and operatively connected with said detector means to effect setting of said selector means in accordance with the operation of said detector means, and body mount detector means adjacent said conveyor in advance of said body detector means to determine whether the body mounts are in proper angular position, said mount detector means including an abutment carried by said mount and normally open switch means engageable by said abutment when the mount is in proper angular position to close said switch means and normally closed switch means opened by cooperaiton of a body support, said two switch means being in parallel and in series with the control circuit of driving means for said conveyor, whereby the conveyor is stopped in the event both said switch means are opened.

7. In apparatus for treating a body having irregular non-symmetrical surfaces, said apparatus including a conveyor movable past a controllable device for projecting a treating liquid and having a body support adapted to rotatably support a body for rotation about an axis that is substantially longitudinal of the body and means for rotating the body as the body support is advanced past said device with means for relatively moving the body and said device in a direction longitudinally of the body, and control means for controlling said device, the improvement in said control means comprising a set of rotatably mounted cams in fixed axially spaced relation, a set of cam followers relatively spaced to respectively engage the cams of said set, means for rotating said cams as a body support is conveyed past said device, means operated by said cam followers and operatively connected with said device to control said device in accordance with the particular portions of a body within the projection range of said device, said set of cams and set of cam followers being relatively movable in a direction axially of said cams to selectively engage said set of followers with said set of cams, actuating means to effect relative axial movement between said set of cams and said set of followers to selectively place said set of followers in operative engagement with said set of cams, control means fixed relative to said conveyor and operatively connected with said actuating means to control operation thereof, and selector means movable with said body support and cooperative with said control means to effect the operation thereof, said selector means comprising a spring pressed lever pivotally mounted on the said body support and movable between predetermined positions and said control means comprising a spring pressed lever movable between predetermined positions and disposed in the path of said first mentioned lever for cooperation therewith.

8. Apparatus according to claim 7 comprising means responsive to the angular position of a body on its axis of rotation for stopping said conveyor unless the body is in a predetermined angular position.

9. Apparatus for treating a body having irregular, non-symmetrical surfaces, comprising a movably supported device for projecting a treating liquid, a conveyor movable past said device and including a body support having a mount adapted to support a body substantially longitudinally of conveyor movement, said mount being rotatably supported by said body support for rotation about an axis that is substantially longitudinal of conveyor movement, means for rotating said mount as said body support is advanced by the conveyor to rotate a body as it is carried longitudinally past said device, a set of rotatably mounted cams in fixed axially spaced relation, a set of cam followers relatively spaced to respectively engage the cams of said set, means for rotating said cams as a body support is conveyed past said device, means operated by said cam followers and operatively connected with said device to control said device in accordance with the particular portions of a body within the projection range of said device, said set of cam followers being movable relative to the set of cams in a direction axially of said cams to selectively engage said set of followers with said cams, actuating means to effect axial movement of said set of followers to selectively place said set of followers in operative engagement with said set of cams, control means operatively connected with said actuating means to control operation thereof, a selector device movable with said body support and cooperative with said control means to effect operation thereof, and body detector means disposed adjacent said conveyor for determining the setting of said selector device in accordance with the body conveyed.

10. Apparatus according to claim 1, wherein said body identifying means includes a settable selector device movable with each body support.

11. Apparatus according to claim 1, wherein said body identifying means includes a detector device adjacent said conveyor.

12. Apparatus according to claim 1, wherein said control mechanism comprises cams and said connector mechanism comprises cam followers, said cams and followers being relatively movable axially for selective engagement, and said actuating means is connected with said cams for moving said cams relative to said followers.

13. Apparatus according to claim 1, wherein said control mechanism comprises cams and said connector mechanism comprises cam followers, said cams and followers being relatively movable axially for selective engagement, and said actuating means is connected with said followers for moving said followers relative to said cams.

References Cited in the file of this patent

UNITED STATES PATENTS

| | | |
|---|---|---|
| 2,345,834 | Schweitzer | Apr. 4, 1944 |
| 2,565,263 | Paasche | Aug. 21, 1951 |
| 2,598,201 | Williams et al. | May 27, 1952 |
| 2,598,246 | Fowler | May 27, 1952 |
| 2,673,548 | Schweitzer | Mar. 30, 1954 |